United States Patent [19]

Ferrara, Jr. et al.

[11] Patent Number: 4,970,949
[45] Date of Patent: Nov. 20, 1990

[54] VERTICALLY ALIGNED BATCH BAKER

[75] Inventors: Daniel A. Ferrara, Jr., Bantam, Conn.; Michael J. Morecroft, Swynnerton Stone, England; Steven C. Pittman, Winterville, N.C.

[73] Assignee: Hamilton Beach, Inc., Washington, N.C.

[21] Appl. No.: 314,657

[22] Filed: Feb. 23, 1989

[51] Int. Cl.⁵ .............................. A47J 27/00
[52] U.S. Cl. ........................ 99/374; 99/378; 99/389; 99/426; 249/78; 249/120; 249/121
[58] Field of Search ............... 99/353, 372, 373, 374, 99/376, 377, 378, 381, 382, 385, 389, 426, 427, 428, 442; 249/78, 81, 120, 121, 170

[56] References Cited

U.S. PATENT DOCUMENTS

| | | | |
|---|---|---|---|
| 746,033 | 12/1903 | Crane | 99/374 |
| 1,490,177 | 2/1923 | Matson | 99/376 |
| 1,546,347 | 7/1925 | Simmons | 99/373 |
| 1,628,310 | 5/1927 | Roos | 99/374 |
| 1,882,363 | 10/1932 | Keyting | 99/381 |
| 1,939,017 | 12/1933 | Naeve | 99/378 |
| 2,352,706 | 5/1941 | Gruenke et al. | 99/381 |
| 2,525,255 | 1/1946 | Badenoch | 99/373 |
| 2,787,947 | 4/1957 | Schatten | 99/389 |
| 4,173,179 | 11/1979 | Arthur | 99/374 |
| 4,817,513 | 4/1989 | Carbon | 99/372 |

Primary Examiner—Philip R. Coe
Assistant Examiner—Mark Spisich
Attorney, Agent, or Firm—Vidas & Arrett

[57] ABSTRACT

A compact oven for preparing freshly baked cakes, muffins, and breads from a pourable batter or vertically oriented disk-shaped molds. A hinged cover completes the enclosure. Heat is applied to each vertical side of the molds.

18 Claims, 5 Drawing Sheets

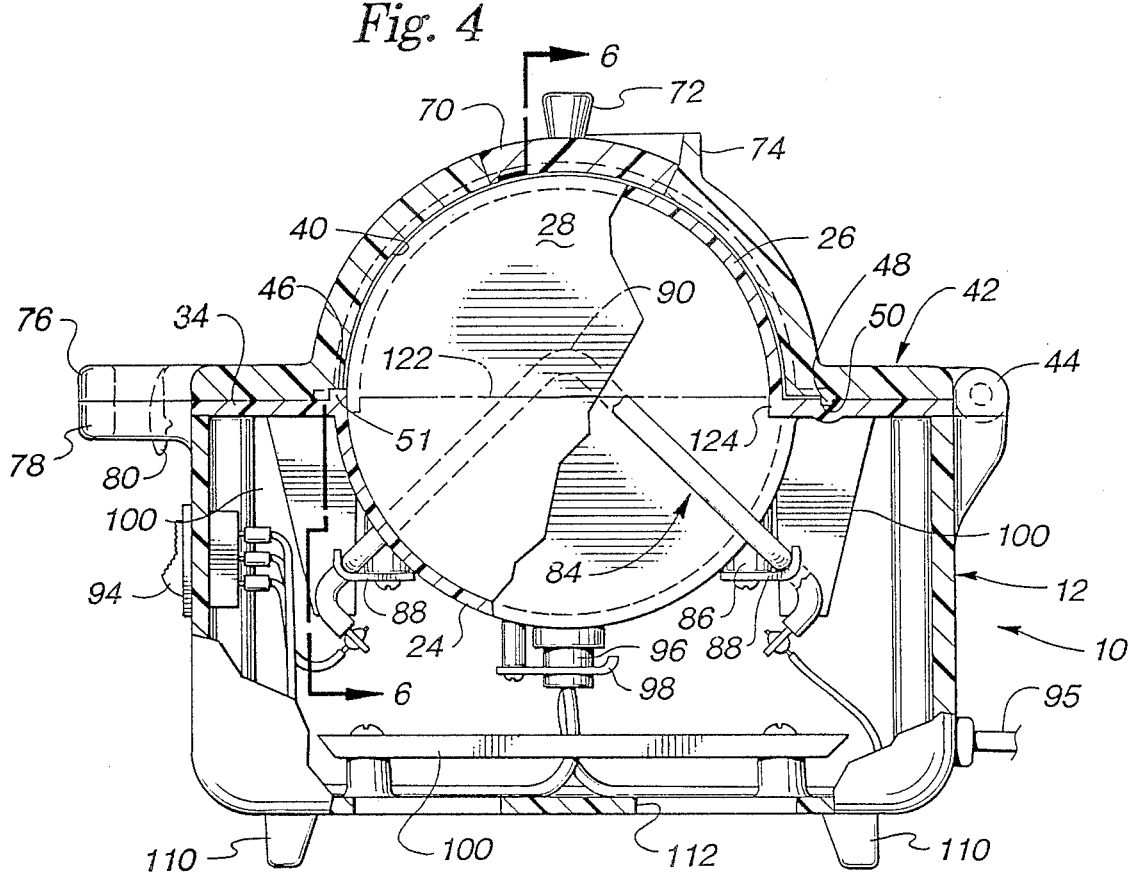

VERTICALLY ALIGNED BATCH BAKER

BACKGROUND OF THE INVENTION

1. Field of the Invention

This invention relates to cooking devices, and more particularly to devices for baking a plurality of disk-shaped comestibles from batter.

2. Description of the Related Art

Previous baking devices include a variety of waffle irons. Art representative of such previous activity is listed below.

U.S. Pat. No. 2,525,255 issued to Badenoch on Oct 10, 1950 shows a single-cavity cooking device for mixing baked products such as waffles and the like. The patent shows a top-filled, electrically heated vertical baking cavity which has an automatic dislodger and ejection for the baked item (FIGS. 1, 2 and 3, Col. 1, lines 50–54, Col. 2, lines 20–25, Col. 2, lines 53–58). This patent shows a vertical baking cavity top filling, electric heat on the sides of the baking cavity and vertical splitting of the mold cavity.

U.S. Pat. No. 3,173,179 issued to Arthur on Nov. 6, 1979 relates to a vertical, side-filled, tongs-type electrically heated cooking assembly which is filled from each side prior to placing the cooking assembly on its edge or on its side in a support which catches drippings from the cooking chambers. The electric heating element is between the two cooking chambers (FIGS. 1-3). The device is in either a horizontal or a vertical position (lines 52-54 of Col. 1). Cover plates 14, 16 are heated by conduction from the central heating plate 12.

U.S. Pat. No. 1,490,177 issued to Matson on Apr. 15, 1924 shows a baking mold which is characterized by multiple, top filled, vertical, horizontally arranged baking cavities and has a hinged cover. The baking heat is externally applied to the mold cavities. The mold is turned over in order to bake the mold contents on both sides.

SUMMARY OF THE INVENTION

The batch baker of the invention provides a compact oven in which breads, muffins and other baked items of a general disk shape may be baked. The device includes a base in which a lower cooking cavity is situated. The lower cavity includes a plurality of generally vertically aligned disk-shaped members. Between the first two disks, the disk circumferences are joined from a midpoint of the disks down to form a hemispherically-shaped trough. That trough forms the lower portion of the cavity into which batter is poured and baked to define a muffin. On either side of each trough the disks are joined along their circumferences from the midpoint up, to form an inverted trough. The undulating patterns of normal and inverted troughs define the lower cooking cavity.

A serpentine heating element generally coiling upon itself is configured in such a way that a "coil" passes into the inverted trough and down below the normal trough and up again into the next inverted trough and so forth. In this manner, heat may be applied to each disk face which defines the generally vertical sides of a muffin.

An upper cover member is hingedly mounted to the base. The upper cover member includes an upper cooking cavity which presents an inverted trough shape which, when closed, mates with the lower cooking cavity to complete the definition of the batter-holding cavities. The upper and lower cooking cavities function as a clamshell-like mold to define the cooking molds for individual muffins or breads.

The upper cover member includes a slotted fill-port opening along its top through which batter may be poured into each of the defined muffin baking cavities. The fill port is then closed with a lid.

A consumer may bake fresh breads or muffins by simply preheating the cooking chamber by turning on power to the heating element. When a ready light so indicates, batter or dough is placed into as many wells as desired through the fill port, which is then closed with the lid. Dough may be measured out and patted into the bottom of the molds while the baker is open. After closing, the dough may be baked, rising to conform to the dimensions of the mold. After baked, the upper cover member is opened to reveal the upper halves of the freshly baked muffins or breads. The comestibles may be removed easily, preferably with the aid of a fork or tonged utensil.

BRIEF DESCRIPTION OF THE DRAWINGS

FIG. 4 is a left side elevational view with parts cut away;

FIG. 5 is a perspective detail of heating element used in the invention;

FIG. 6 is a fragmentary sectional view taken along line 6—6 in FIG. 4; and

DESCRIPTION OF THE PREFERRED EMBODIMENTS

Figure 1:
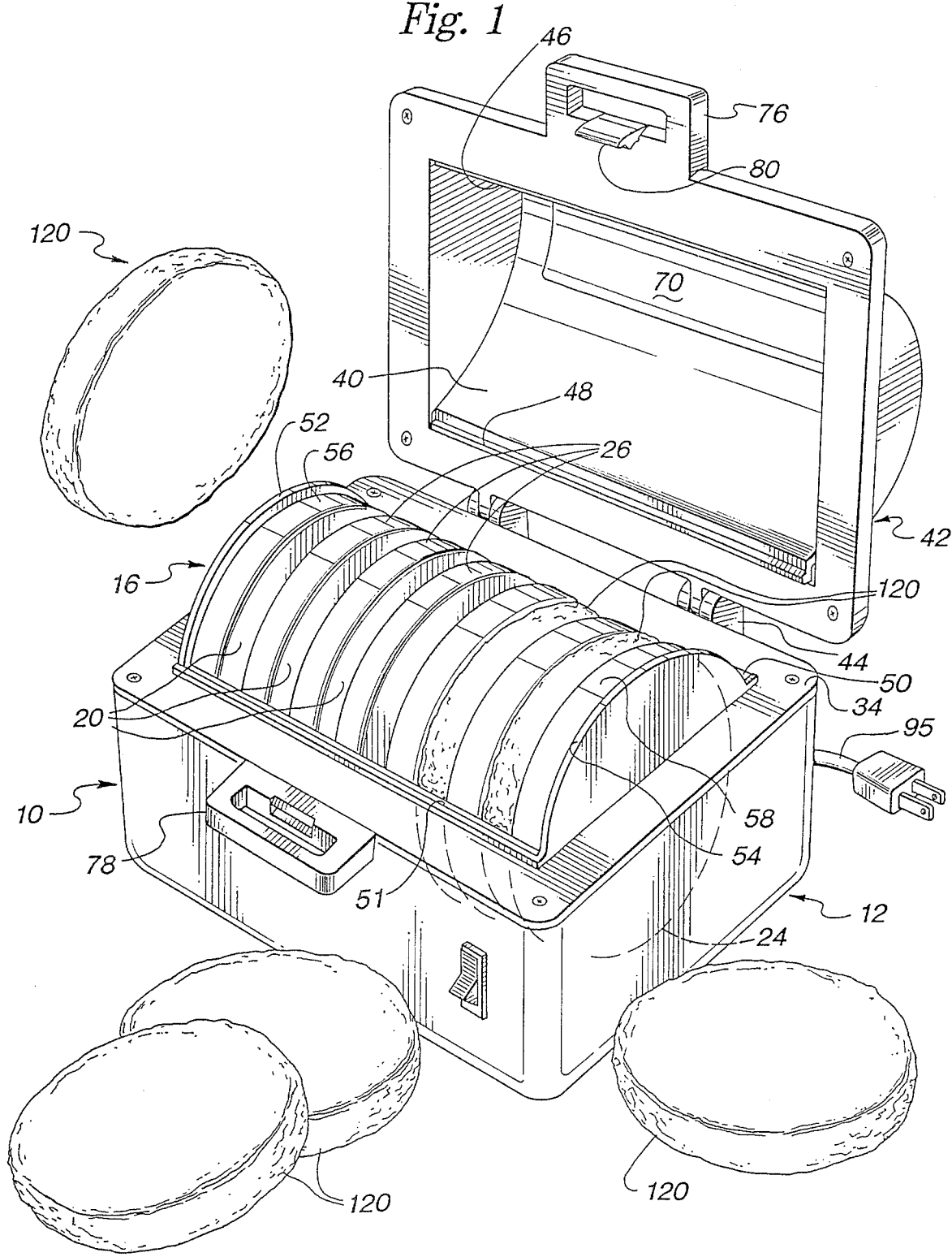
FIG. 1 is a perspective view of the invention subject surrounded by finished baked product.
Figure 2:
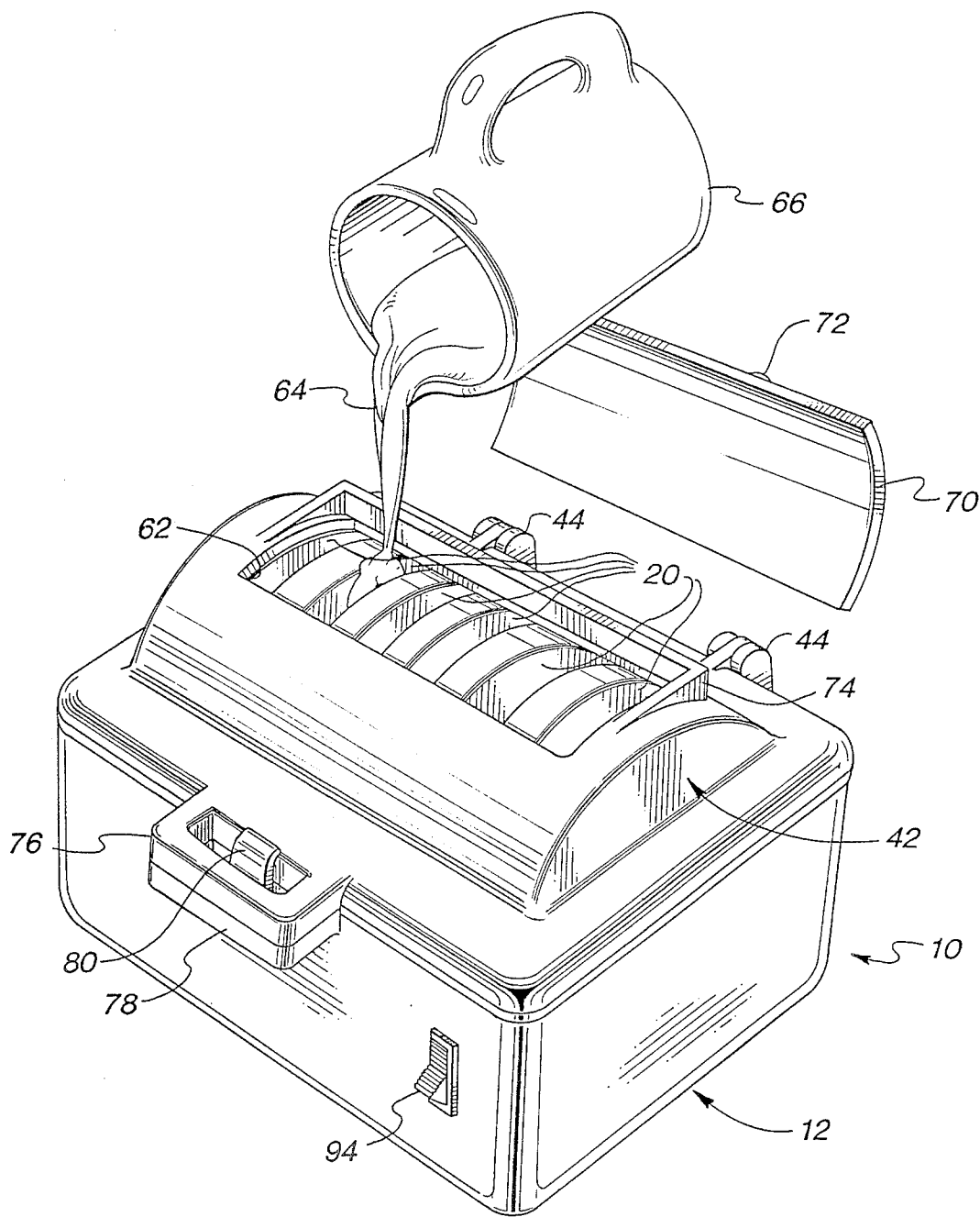
FIG. 2 is a perspective view of the subject shown having batter mix poured into mold spaces prior to baking.

With particular reference to FIGS. 1 and 2, the vertically aligned batch baker 10 is shown as a compact, countertop appliance which prepares freshly baked comestibles in minutes from batter or dough. Baker 10 includes a lower housing or base 12 which encloses the heating mechanisms and carries the controls.

Figure 7:
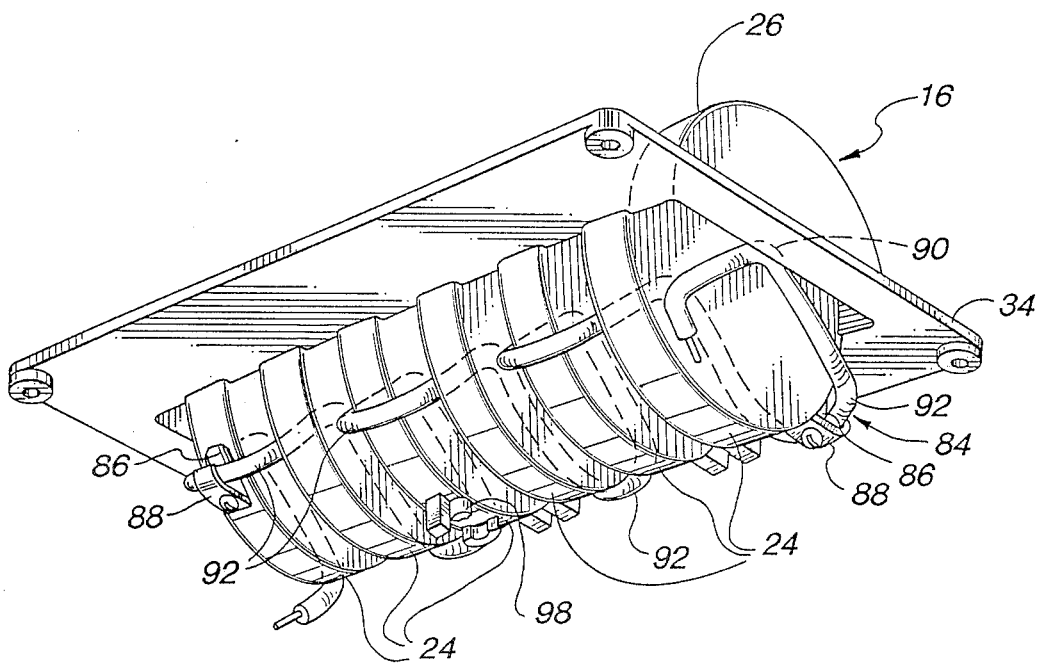
FIG. 7 is a perspective view of the cooking cavity in association with the heating element.

Base 12 supports lower cooking cavity 16 which is shown in FIGS. 1 and 7. Cooking cavity 16 forms a partial mold to carry and define comestibles to be baked. As shown, cooking cavity 16 is formed with six muffin cavities so that up to six muffins may be made at a time. The cavity 16 may include fewer or greater muffin cavities or molds 20 if desired. Cavity 16 defines molds which are each separated such that heat may be applied to both vertical faces of the molds for baking. FIGS. 1, 6 and 7 best show that cavity 16 is essentially a combination of alternating normally oriented semicircular chambers 24 and inverted semicircular chambers 26. FIGS. 6 and 7 show that a muffin cavity 20 is defined by a single normal semicircular chamber 24 and two inverted semicircular chambers 26.

Preferably, cavity 16 is a single piece mold in which muffin cavity 20 is defined by two generally vertically oriented disks 28, 30 whose faces define a portion of the inverted chambers 26 and both vertical walls of normally oriented chamber 24. Cavity 16 is preferably cast from an aluminum alloy and may have a wall thickness on the order of 0.075 inches (0.19 cm). A non-stick coating on the comestible contacting side of cavity 16 may be applied to make cleaning and removal of muffins easier.

As shown in FIGS. 1 and 7, cavity 16 preferably is formed to include a wide flange 34 about the periphery at approximately the height of the normal semicircular chambers 24. Flange 34 functions as a support which may rest upon the walls of lower housing 12 and form a portion of a seal between cavity 16 and an upper, inverted trough shaped cooking cavity 40 which is a portion of cover 42.

Cover 42 is preferably hingedly mounted via hinges 44 to base 12 as shown in the Figures. Upper cooking cavity 40 preferably includes a lip 48 which mates with a channel 50 formed in, flange 34. The device also preferably includes a groove 46 which mates with a projecting ridge 51. This, in combination with ridges 52, 54 on the periphery of end chamber 56, 58 provides a low pressure seal between the lower cooking cavity 16 and upper cavity 40. Cover 42 may be formed from a molded plastic and upper cavity 40 may be formed of the same coated alloy as lower cavity 16. An insulating air gap may be formed between upper cavity 40 and cover 42.

Figure 3:
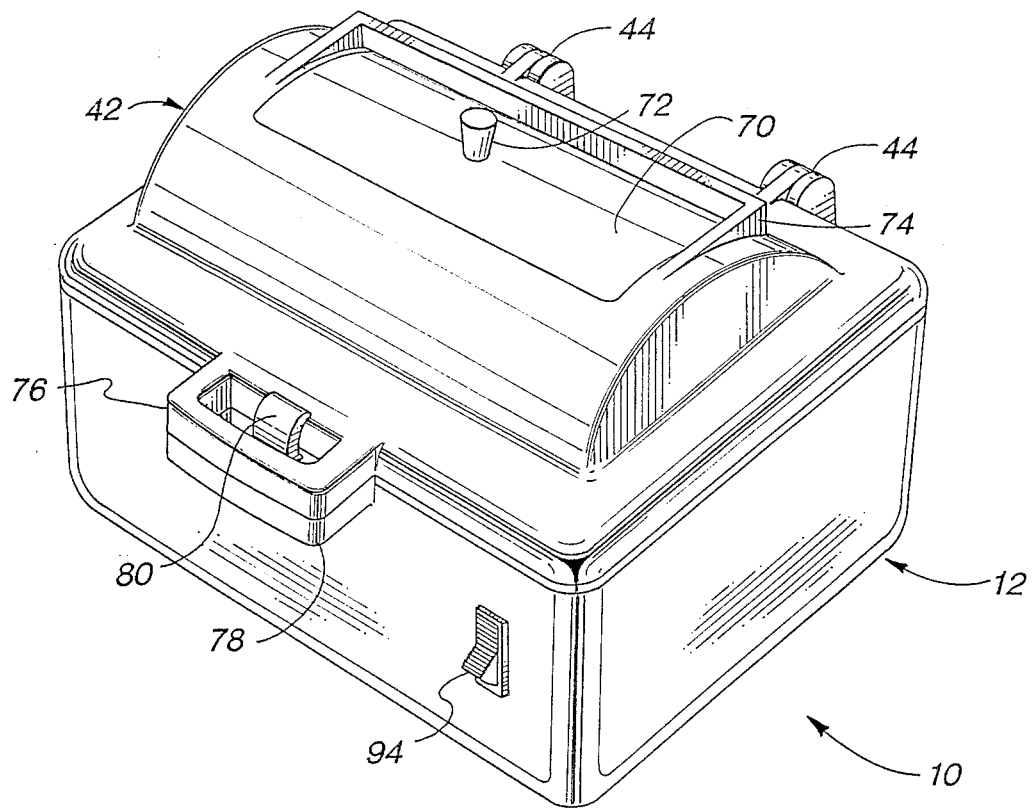
FIG. 3 is a perspective view of the subject shown closed and latched.

With reference to FIGS. 2 and 3, it will be seen that cover 42 includes a fill-port 62 through which batter 64 from a measuring cup 66 may be poured into each muffin cavity 20. Fill-port 62 is closed off by a hinged or removable lid 70 which has a handle 72. Cover 42 may also include a raised batter dam 74 to catch spills from poured batter.

For convenience, upper and lower handle members 76, 78 may be provided to enable easy movement of baker 10 from a cabinet to a countertop. A latch 80 may be included to keep the upper cavity 40 in engagement with lower cavity 16.

Base 12 also houses the heating components of the baker 10. A serpentine heating element 84 is supported by brackets 86 and retainers 88 so that peaks 90 of element 84 extend up into inverted semicircular chambers 26. The heating element 84 is coil-like and reverses back upon itself as shown in FIGS. 5 and 6 at 92 such that arches are formed having peaks 90. This construction provides heat to both sides of each muffin mold 20. Any heating mechanism which would provide heat to each side of molds 20 is usable in the inventions.

The heating mechanism is controlled by a power switch 94 to cut power from cord 95. A thermostat 96 held by retainer 98 provides control to element 84 to maintain a given heat range. The desired operating temperature is about 350° F. (177° C). In addition, the unit may include a safety thermal cut-off switch to completely shut off power if the thermostat cannot maintain the proper level of heat.

Simple heat reflective shields 100 are located within base 12 at the bottom and all four sides around the heating element to reflect heat up toward the lower cooking cavity 16. This makes the baker 10 more efficient and prevents the base 12 from getting too hot. Standoff feet 110 also function to place an insulting air gap between a counter and baker 10. Vent holes 112 in the bottom of base 10 help to dissipate heat.

In operation, a user preheats the baker 10 to its operating temperature, which may be indicated by a light such as found on waffle irons. Prepared batter 64 is then poured through fill-port 62 into as many of the muffin cavities 20 as desired. Dough mixture would be placed into the cavity 20 through fill-port 62 or with cover 42 open. Generally speaking, approximately ¼ cup of batter or dough is needed if the cavities 20 are sized as conventional English muffins. By eye, a user can add batter or dough until the normally oriented semicircular chambers 24 are nearly full (which is about half the volume of a baked comestible).

The lid 70 is then replaced. Baking is usually complete in about 4–6 minutes depending on the water content of the batter. Mixes with fruit may require 6 minutes, while drier mixes may be ready in 4 minutes. The status can be checked by removing lid 70.

When done, cover 42 is unlatched and opened on its hinges to a position as shown in FIG. 1. A tined fork may then be inserted into the baked comestible 120 which is readilY removed from the now open mold. As best shown in FIG. 6, the generally verticallY oriented disks 28, 30 which are a portion of lower cooking cavity 16 are preferably spaced to be wider at the top than the bottom. This makes removal of the muffins 120 from the molds 20 easier without detracting from the appearance of the baked product. Switch 94 should be turned off when all cooking is complete.

While the lower cooking cavity 16 has been described as defining semicircular muffin molds 20, those molds need not actually be circular in shape. The use of the term "generally disk-shaped" in the specification and claims refers to any mold which defines a space in which the distance between points 122, 124 is greater than the distance between any horizontal line drawn between points on a face of the molds. It includes ovals and even angular shapes such as diamonds or shapes similar to a square with a bulging middle. The "generally disk-shape" may be nearly any shape so long as the comestible may be readily removed without damage from its mold. To insure that the comestible will be easily removed from the molds, the molds should be tapered with the widest portion being at the top of the cavities 20 such that the planes of disks 28, 30 would intersect, if at all, below the heating element.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A cooking device for forming generally disk-shaped comestibles from a dough mixture or pourable batter, the device comprising:
   (a) base means;
   (b) cover means mounted above said base means, said base means and cover means each including comestible mold means which cooperate to matingly define a plurality of vertically aligned generally disk-shaped cavities for forming generally disk-shaped comestibles; and
   (c) heating means for providing heat to each vertical side of each of said vertically aligned generally disk-shaped cavities defined by said base means and cover means.

2. The cooking device of claim 1 wherein said cover means is hingedly mounted to an edge of said base means.

3. The cooking device of claim 1 wherein said base means includes a comestible lower mold, said lower mold including a plurality of generally vertically aligned disk-shaped members; the outermost disks are semicircular in shape and cooperate with an adjacent first circular disk to define an inverted semicircular chamber; a further circular disk adjacent to said first circular disk cooperates with said first circular disk to define a semicircular chamber with an upper opening; further disks are constructed and arranged to present alternating inverted and non-inverted semicircular chambers.

4. The cooking device of claim 3 wherein said heating means comprises a coil-like heating element associated with said mold in such a way that a portion of said heating element enters each inverted semicircular chamber and passes beneath each non-inverted semicircular chamber.

5. The cooking device of claim 3 wherein said cover means includes an upper mold comprising an elongated inverted semicircular trough constructed and arranged in such a way that said trough may matingly engage with said lower mold to form therewith at least one disk-shaped cavity for forming disk-shaped comestibles.

6. The cooking device of claim 5 wherein said cover means includes an opening through which batter may be poured to descend into underlying cavities.

7. The cooking device of claim 3 wherein the width between disks of said non-inverted semicircular chambers is not greater at the bottom of the chambers than at the top of the chambers.

8. The cooking device of claim 3 wherein said comestible mold comprises at least two non-inverted semicircular chambers.

9. The cooking device of claim 3 wherein said comestible mold is cast as a unit.

10. The cooking device of claim 4 wherein said heating element is shaped to form a plurality of arches, each inverted semicircular chamber being entered by an upper portion of an arch of said heating element.

11. A cooking device for forming generally disk-shaped baked comestibles from a dough mixture or pourable batter, the device comprising:
(a) base means;
(b) upper housing means mating with said base means to define an enclosure therewithin;
(c) comestible mold means within said enclosure for providing a plurality of spaced molds each defining a generally vertically oriented disk shape; and
(d) heating means within said enclosure for providing heat to each vertical side of each of said spaced molds.

12. The cooking device of claim 11 wherein said mold means includes a lower mold section and an upper mold section, said upper mold section being attached to said upper housing means and said lower mold being supported by said base means.

13. The cooking device of claim 12 wherein said lower mold section comprises a series of alternating inverted and non-inverted semicircular chambers, an inverted semicircular chamber being adjacent to both ends of said lower mold section.

14. The cooking device of claim 13 wherein said upper mold section is constructed and arranged to overlay said lower mold section such that individual molds of generally vertically-oriented, generally disk shape are defined for each non-inverted semicircular chamber.

15. The cooking device of claim 13 wherein said heating means comprises a heating element constructed and arranged in such a way that a portion of said heating element is adjacent to the interior of each inverted semicircular chamber and the exterior of each non-inverted semicircular chamber.

16. The cooking device of claim 12 wherein said upper housing means is hingedly mounted to said base means in such a way that said lower mold section and upper mold sections may releasably mate with movement of the upper housing means on a hinge.

17. The cooking device of claim 14 wherein said individual molds of generally vertically-oriented, generally disk shape have a width which is not greater at the bottom than the top to facilitate removal of cooked comestibles.

18. The cooking device of claim 11 wherein said upper housing means includes an upper fill-port and fill-port cover.

* * * * *